US012608385B2

(12) United States Patent (10) Patent No.: US 12,608,385 B2
Xue et al. (45) Date of Patent: Apr. 21, 2026

(54) MACHINE LEARNING TO INFER TITLE LEVELS ACROSS ENTITIES

(71) Applicant: Microsoft Technology Licensing, LLC, Redmond, WA (US)

(72) Inventors: Huichao Xue, Santa Clara, CA (US); Xiaoqing Wang, San Jose, CA (US); Chao Wang, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/892,931

(22) Filed: Sep. 23, 2024

(65) Prior Publication Data

US 2025/0013651 A1 Jan. 9, 2025

Related U.S. Application Data

(63) Continuation of application No. 17/592,128, filed on Feb. 3, 2022, now Pat. No. 12,105,720.

(51) Int. Cl.
G06F 16/2457 (2019.01)

(52) U.S. Cl.
CPC .............................. G06F 16/24578 (2019.01)

(58) Field of Classification Search
CPC .................................................. G06F 16/24578
USPC .......................................................... 707/723
See application file for complete search history.

(56) References Cited

U.S. PATENT DOCUMENTS

| | | |
|---|---|---|
| 11,853,817 B2 | 12/2023 | Kulkarni |
| 12,125,067 B1 | 10/2024 | Fogarty |

| | | | | |
|---|---|---|---|---|
| 2007/0273909 | A1* | 11/2007 | Chen | G06Q 30/08 |
| | | | | 358/3.22 |
| 2010/0121792 | A1* | 5/2010 | Yang | G06F 16/9024 |
| | | | | 708/441 |
| 2014/0122355 | A1* | 5/2014 | Hardtke | G06Q 10/1053 |
| | | | | 705/321 |
| 2015/0006422 | A1* | 1/2015 | Carter | G06Q 10/1053 |
| | | | | 705/321 |
| 2016/0261544 | A1 | 9/2016 | Conover | |
| 2017/0228696 | A1* | 8/2017 | Brdiczka | G06Q 10/1053 |
| 2018/0336241 | A1* | 11/2018 | Noh | G06F 16/242 |
| 2020/0005134 | A1 | 1/2020 | Ramanath | |
| 2020/0175476 | A1 | 6/2020 | Gee et al. | |
| 2020/0364250 | A1 | 11/2020 | Kube | |
| 2020/0380470 | A1 | 12/2020 | Wakankar et al. | |

(Continued)

OTHER PUBLICATIONS

Non-Final Office Action mailed on Jul. 7, 2025, in U.S. Appl. No. 17/962,364, 25 Pages.

(Continued)

*Primary Examiner* — Kimberly L Wilson

(74) *Attorney, Agent, or Firm* — KDW Firm PLLC

(57) ABSTRACT

In an example embodiment, machine learning is used to train a machine-learned model that projects each entity, title pair into a single number, called a seniority score, to represent the career progression needed for that position. For example, company A's "software engineer" and company B's "senior software engineer" can be represented as two separate numbers, one being p (company A, software engineer) and the other being p (company B, senior software engineer) on the same axis. This allows a comparison to be made about the absolute levels of each title despite their potential different meanings at different entities.

20 Claims, 6 Drawing Sheets

(56) References Cited

U.S. PATENT DOCUMENTS

| | | | |
|---|---|---|---|
| 2021/0034975 A1* | 2/2021 | Luo | G06Q 30/0269 |
| 2022/0245659 A1 | 8/2022 | Zhang et al. | |
| 2023/0334308 A1 | 10/2023 | Zheng | |
| 2024/0119278 A1* | 4/2024 | Zhang | G06N 3/045 |

OTHER PUBLICATIONS

Notice of Allowance mailed on Nov. 10, 2025, in U.S. Appl. No. 17/962,364, 12 pages.

* cited by examiner

FRONT END

APPLICATION LOGIC LAYER

DATA LAYER

USER INTERFACE (e.g., WEB SERVER) MODULE(S)   112

USER INTERACTION DETECTION MODULE   113

APPLICATION SERVER MODULE   114

SEARCH ENGINE   116

SOCIAL NETWORKING SYSTEM   110

PROFILE DATA (e.g., USER, COMPANY, SCHOOL)   118

SOCIAL GRAPH DATA   120

USER ACTIVITY AND BEHAVIOR DATA   122

JOB LISTING DATABASE   124

MACHINE LEARNING TO INFER TITLE LEVELS ACROSS ENTITIES

CROSS REFERENCE TO RELATED APPLICATIONS

This application is a continuation of and claims priority to U.S. patent application Ser. No. 17/592,128, filed on Feb. 3, 2022, entitled "Machine Learning to Infer Title Levels Across Entities", the disclosures of which is incorporated herein by reference in its entireties.

TECHNICAL FIELD

The present disclosure generally relates to technical problems encountered in machine learned models. More particularly, the present disclosure relates to using machine learned models to infer title levels across entities.

BACKGROUND

The rise of the Internet has occasioned two disparate yet related phenomena: the increase in the presence of online networks, such as social networking services, with their corresponding user profiles visible to large numbers of people, and the increase in the use of these online networking services to provide content. An example of such content is job listing content. Here, job listings are posted to a social networking service, and these job listings are presented to users of the social networking service, either as results of job searches performed by the users in the social networking service, or as unsolicited content presented to users in various other channels of the social networking service.

Job-related content can also be presented in online networking services in other ways. For example, users may list their current jobs in their user profiles, including an indication of the entity they work for and their job title. Other users may view these user profiles and see this information. Additionally, as a user updates their user profile (such as to reflect a promotion) or performs other social networking updates (such as indicating they were mentioned in a news article), their job title may additionally be shared with other users at this point.

Regardless of the context in which it is presented, a job title may cause confusion to the reader as the same job title may not have the same meaning across different employing entities. For example, a job seeker may get two offers: a senior software engineer at company A, and a staff software engineer at company B, but may not know which one is more senior.

Past solutions involved crowdsourcing title information, where users submit a description of the different levels of job titles for the company they work for. Such a solution, however, is unable to scale as it relies upon user contributions to work. Additionally, only a small percentage of workers have any motivation to contribute such information to a third-party source, let alone know where and how to do so.

Another solution would be to use machine-learning on the user-contributed data to infer data about similar companies, to essentially "fill-in-the-gaps" for entities that lack title-level data. Such solutions, however, cause inaccurate projections, due to biases introduced in the input data itself due to differences between the type of person who would contribute such information to a third party and the type of person who would not, and also due to the types of entities that would tend to employ such different types of people.

The result is that the input data itself is biased, and the training data as a whole is biased as the input data comes from sources that are not evenly distributed across entities.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
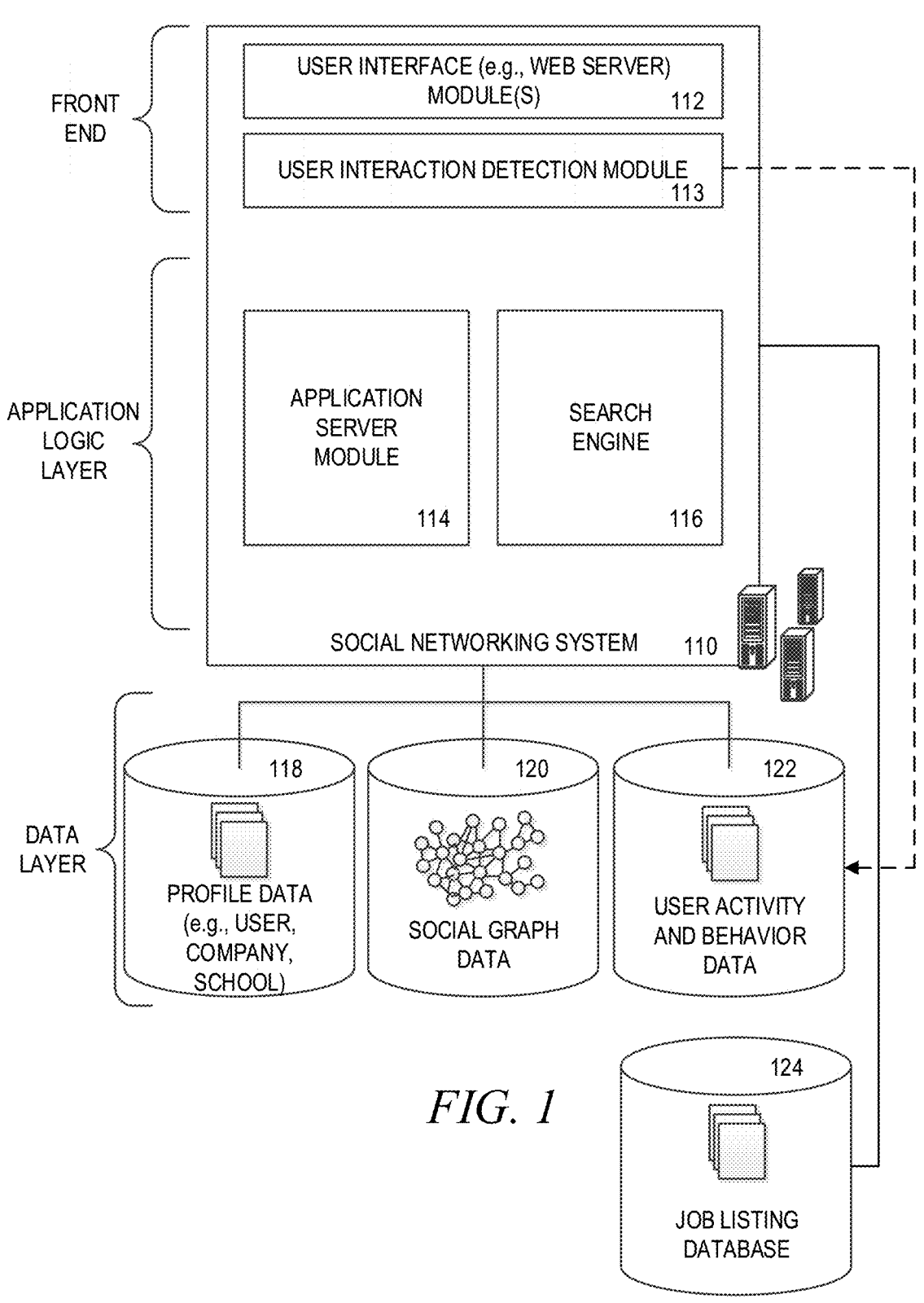
FIG. 1 is a block diagram showing the functional components of a social networking service, including a data processing module referred to herein as a search engine, for use in generating and providing search results for a search query, consistent with some embodiments of the present disclosure.

In an example embodiment, machine learning is used to train a machine-learned model that projects each entity, title pair into a single number, called a seniority score, to represent the career progression needed for that position. For example, company A's "software engineer" and company B's "senior software engineer" can be represented as two separate numbers, one being p (company A, software engineer) and the other being p (company B, senior software engineer) on the same axis. This allows a comparison to be made about the absolute levels of each title despite their potential different meanings at different entities.

In an example embodiment, the concept of career velocity is introduced. Career velocity may be defined as a seniority score (as computed by a seniority function) for a target title of a transition (i.e., the title of the job the user transitioned to) minus a seniority score (as computed by the same seniority function) for a source title of the transition (i.e., the title of the job the user transitioned from), divided by the number of years the transition took (i.e., the year in which the user obtained the target title minus the year in which the user obtained the source title, based on the time between when the user started the source job and when the user started the target job).

It should be noted that, for purposes of this document, a source title and/or source job refers to the title/job the user held at the beginning of a transition, whereas a target title and/or target job refers to the title/job the user held at the end of a transition.

The seniority function may be learned as an embedding model by a machine learning algorithm. An embedding model is a machine-learned model in which input vectors are mapped/translated (known as "embedded") into a point in a latent n-dimensional space. In an example embodiment, n is 1, thus the input vectors (in this case, title/entity pairs) are each embedded into points in the one-dimensional space.

The embedding model may be trained to predict a seniority score for any title/entity combination that is input to it, in accordance with an example embodiment. The machine learning algorithm takes as input training data. This training data may include profile transition histories for a number of different title/entity combinations. A profile transition history is a history of the title transitions in a user profile. A title transition occurs when a user changes their title to a new title, either due to a promotion/demotion within the same employing entity, or due to the user changing the employing entity he or she works for. Thus, the user profile for a user may contain all of the job titles the user has had since establishing the user profile (or even before the user has established the user profile, if the user chooses to enter prior work history when establishing the profile), and the order in which they were held. The profile transition history reflects these job titles and the order.

The machine learning algorithm calculates, for each transition in each vector in the training data, a velocity. Velocity may be defined as a seniority score (as computed by a seniority function) for a target title of a transition (i.e., the title of the job the user transitioned to) minus a seniority score (as computed by the same seniority function) for a source title of the transition (i.e., the title of the job the user transitioned from), divided by the number of years the transition took (i.e., the year in which the user obtained the target title minus the year in which the user obtained the source title).

The training involves learning the seniority function (i.e., the projections), by minimizing a loss function. In an example embodiment, this involves solving a maximum likelihood estimation problem, which is equivalent with minimizing the squared error between the velocities and 1.

The learning process involves the machine learning algorithm changing the seniority function over and over again, until the loss function (in this case the minimum squared error) is minimized.

Once trained, the embedding model may be used to project a seniority level for a title/entity combination in a variety of contexts. In one example context, a seniority level for a current title/entity of a job searcher may be determined (either at runtime or from a periodic determination performed for a number of potential job searchers). The seniority levels for title/entity combinations for a number of job listings being considered for recommendation may also be computed, and these seniority levels can be compared with the job searcher's current seniority level to determine which of the job listings to recommend (and in what order). The result is more relevant job recommendations for job searchers, and specifically fewer instances of "title mismatch" issues, where a senior-level worker is presented with job recommendations of job listings for lower-level jobs, or vice-versa.

DESCRIPTION

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

FIG. 1 is a block diagram showing the functional components of a social networking service, including a data processing module referred to herein as a search engine, for use in generating and providing search results for a search query, consistent with some embodiments of the present disclosure.

As shown in FIG. 1, a front end may comprise a user interface module 112, which receives requests from various client computing devices and communicates appropriate responses to the requesting client devices. For example, the user interface module(s) 112 may receive requests in the form of Hypertext Transfer Protocol (HTTP) requests or other web-based API requests. In addition, a user interaction detection module 113 may be provided to detect various interactions that users have with different applications, services, and content presented. As shown in FIG. 1, upon detecting a particular interaction, the user interaction detection module 113 logs the interaction, including the type of interaction and any metadata relating to the interaction, in a user activity and behavior database 122.

An application logic layer may include one or more various application server modules 114, which, in conjunction with the user interface module(s) 112, generate various user interfaces (e.g., web pages) with data retrieved from various data sources in a data layer. In some embodiments, individual application server modules 114 are used to implement the functionality associated with various applications and/or services provided by the social networking service.

As shown in FIG. 1, the data layer may include several databases, such as a profile database 118 for storing profile data, including both user profile data and profile data for various organizations (e.g., companies, schools, etc.). Consistent with some embodiments, when a person initially registers to become a user of the social networking service, the person will be prompted to provide some personal information, such as his or her name, age (e.g., birthdate), gender, interests, contact information, home town, address, spouse's and/or family members' names, educational background (e.g., schools, majors, matriculation and/or graduation dates, etc.), employment history, skills, professional organizations, and so on. This information is stored, for example, in the profile database 118. Similarly, when a representative of an organization initially registers the organization with the social networking service, the representative may be prompted to provide certain information about the organization. This information may be stored, for example, in the profile database 118, or another database (not shown). In some embodiments, the profile data may be processed (e.g., in the background or offline) to generate various derived profile data. For example, if a user has provided information about various job titles that the user has held with the same organization or different organizations, and for how long, this information can be used to infer or derive a user profile attribute indicating the user's overall seniority level or seniority level within a particular organization. In some embodiments, importing or otherwise accessing data from one or more externally hosted data sources may enrich profile data for both users and organizations. For instance, with organizations in particular, financial data may be imported from one or more external data sources and made part of an organization's profile. This importation of organization data and enrichment of the data will be described in more detail later in this document.

Once registered, a user may invite other users, or be invited by other users, to connect via the social networking service. A "connection" may constitute a bilateral agreement by the users, such that both users acknowledge the establishment of the connection. Similarly, in some embodiments, a user may elect to "follow" another user. In contrast to establishing a connection, the concept of "following" another user typically is a unilateral operation and, at least in some embodiments, does not require acknowledgement or approval by the user that is being followed. When one user follows another, the user who is following may receive status updates (e.g., in an activity or content stream) or other messages published by the user being followed, relating to various activities undertaken by the user being followed. Similarly, when a user follows an organization, the user becomes eligible to receive messages or status updates published on behalf of the organization. For instance, messages or status updates published on behalf of an organization that a user is following will appear in the user's personalized data feed, commonly referred to as an activity stream or content stream. In any case, the various associations and relationships that the users establish with other users, or with other entities and objects, are stored and maintained within a social graph in a social graph database 120.

As users interact with the various applications, services, and content made available via the social networking service, the users' interactions and behavior (e.g., content viewed, links or buttons selected, messages responded to, etc.) may be tracked, and information concerning the users' activities and behavior may be logged or stored, for example, as indicated in FIG. 1, by the user activity and behavior database 122. This logged activity information may then be used by the search engine 116 to determine search results for a search query.

Although not shown, in some embodiments, the social networking system 110 provides an API module via which applications and services can access various data and services provided or maintained by the social networking service. For example, using an API, an application may be able to request and/or receive one or more recommendations. Such applications may be browser-based applications or may be operating system-specific. In particular, some applications may reside and execute (at least partially) on one or more mobile devices (e.g., phone or tablet computing devices) with a mobile operating system. Furthermore, while in many cases the applications or services that leverage the API may be applications and services that are developed and maintained by the entity operating the social networking service, nothing other than data privacy concerns prevents the API from being provided to the public or to certain third parties under special arrangements, thereby making the navigation recommendations available to third-party applications and services.

Although the search engine 116 is referred to herein as being used in the context of a social networking service, it is contemplated that it may also be employed in the context of any website or online services. Additionally, although features of the present disclosure are referred to herein as being used or presented in the context of a web page, it is contemplated that any user interface view (e.g., a user interface on a mobile device or on desktop software) is within the scope of the present disclosure.

In an example embodiment, when user profiles are indexed, forward search indexes are created and stored. The search engine 116 facilitates the indexing and searching for content within the social networking service, such as the indexing and searching for data or information contained in the data layer, such as profile data (stored, e.g., in the profile database 118), social graph data (stored, e.g., in the social graph database 120), and user activity and behavior data (stored, e.g., in the user activity and behavior database 122). The search engine 116 may collect, parse, and/or store data in an index or other similar structure to facilitate the identification and retrieval of information in response to received queries for information. This may include, but is not limited to, forward search indexes, inverted indexes, N-gram indexes, and so on.

As described above, example embodiments may be utilized for ranking and/or selection of job listings. These job listings may be posted by job posters (entities that perform the posting, such as businesses) and stored in job listing database 124.

Figure 2:
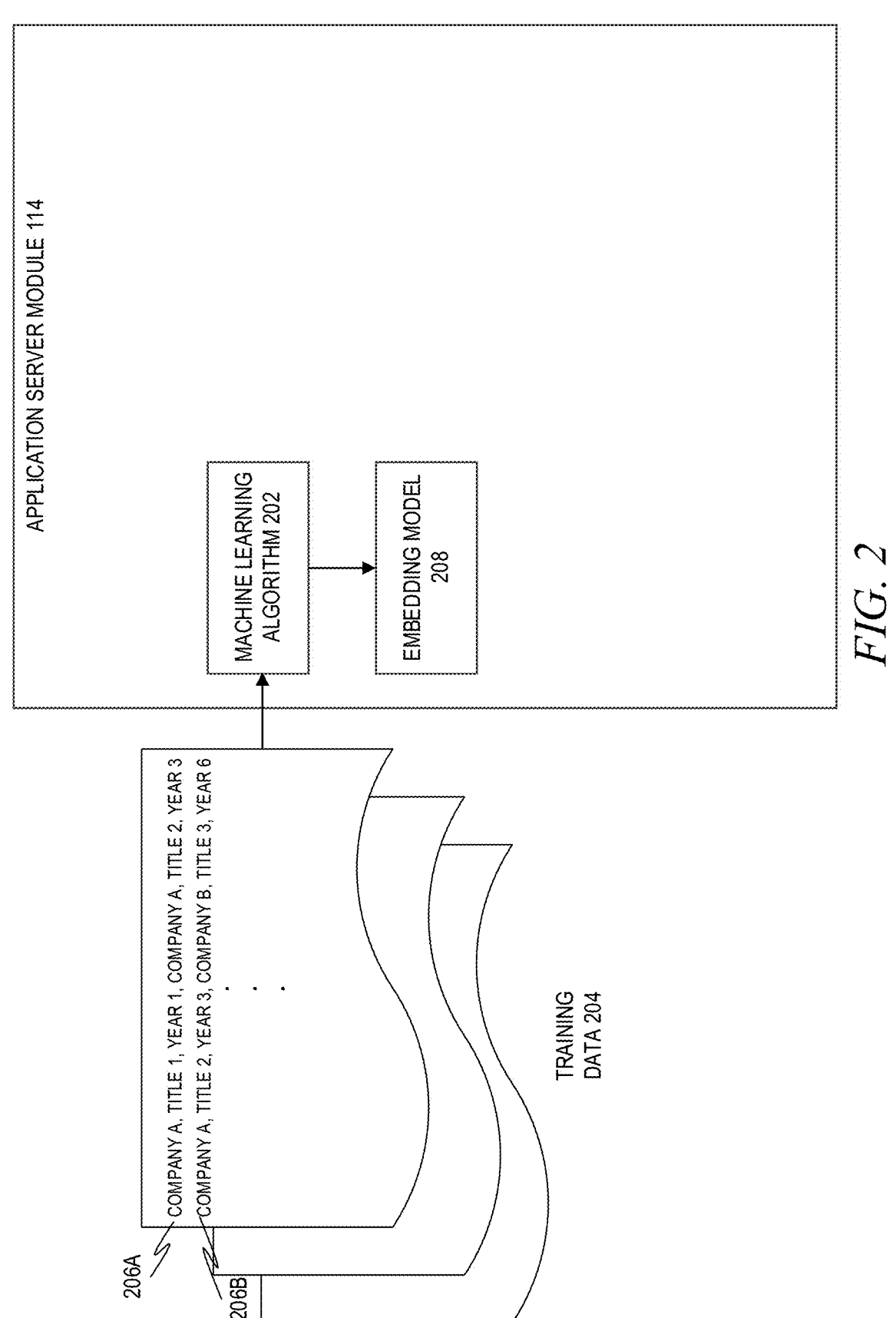
FIG. 2 is a block diagram illustrating the application server module of FIG. 1 in more detail, in accordance with an example embodiment.

FIG. 2 is a block diagram illustrating the application server module 114 of FIG. 1 in more detail, in accordance with an example embodiment. While in many embodiments the application server module 114 will contain many subcomponents used to perform various different actions within the social networking system 110, in FIG. 2 only those components that are relevant to the present disclosure are depicted.

Here the application server module 114 performs training of an embedding model to predict a seniority score for any title/entity combination that is input to it, in accordance with an example embodiment. The application server module 114 includes a machine learning algorithm 202 that takes as input training data 204. In an example embodiment, the training data includes profile transition histories for a number of different title/entity combinations. A profile transition history is a history of the title transitions in a user profile. A title transition occurs when a user changes their title to a new title, either due to a promotion/demotion within the same employing entity, or due to the user changing the employing entity he or she works for. Thus, the user profile for a user may contain all of the job titles the user has had since establishing the user profile (or even before the user has established the user profile, if the user chooses to enter prior work history when establishing the profile), and the order in which they were held. The profile transition history reflects these job titles and the order.

In an example embodiment, the training data 204 may be transformed prior to being input into the machine learning algorithm 202, to format the training data 204 in a standardized format. FIG. 2 depicts one such standardized format, where each user's title information is stored as a series of triples, each triple containing an entity ID (e.g., the company the user worked for), a title, and a year in which the title was obtained by the user. Each triple represents a single transition from a source title to a target title. Thus, each triple is a vector that uniquely corresponds to a different transition. It should be noted that this format essentially excludes any user information in the triples (as the identity of the user to whom each transition pertains is not important to the machine learning algorithm 202); thus, triple 206A may represent a transition from one title to another title for a first user, and triple 206B may represent a transition from one title to another title for either the first user or a different user.

The machine learning algorithm 202 uses the training data 204 to train an embedding model 208. This training will be described in more detail below, but eventually results in an embedding model 208 that can take as input any entity/title combination and output a predicted seniority score for that combination.

The machine learning algorithm 202 calculates, for each transition in each vector in the training data 204, a velocity. Velocity may be defined as a seniority score (as computed by a seniority function) for a target title of a transition (i.e., the title of the job the user transitioned to) minus a seniority score (as computed by the same seniority function) for a source title of the transition (i.e., the title of the job the user transitioned from), divided by the number of years the transition took (i.e., the year in which the user obtained the target title minus the year in which the user obtained the source title).

The training involves learning the seniority function (i.e., the projections), which can be solved by solving a maximum likelihood estimation problem, which is equivalent with minimizing the squared error between the velocities and 1. This involves solving the equation below:

$$\arg\min_{p} \sum_{(source, target, Years)=D} \left( \frac{p(\text{target}) - p(\text{source})}{\text{Years}} - 1 \right)^2$$

Where p is the seniority function, target is the target position, and source is the source position. The machine learning algorithm 202 may also assume that overall users' career progression velocities form a normal distribution centered at 1. By assuming a normal distribution, any variance is spread across the entire population of users in the training data. By centering the distribution around 1, an overall upward trajectory for career progression may be assumed.

The learning process involves the machine learning algorithm 202 changing the seniority function over and over again, until the minimum squared error is minimized.

The seniority function p may be an embedding function, and thus the embedding model 208 may be classified as an embedding model. Here, the embedding function predicts an embedding into a 1-dimensional vector space in which a two-dimensional vector (entity, title) can be translated. It should be noted that this embedding model is different than prior art embedding models. More particularly, prior art embedding models are multidimensional and are used in a manner such that the direction between embedded points does not matter. Specifically, when, for example, a two-dimensional embedding model was used in the prior art, all that would matter would be the distance between two embedded points in the two-dimensional space, as the distance would indicate similarity of the underlying data that was embedded; the fact that one of the points was further along in the y axis than another would not matter as a separate indicator of anything other than being used as part of that distance calculation. In an example embodiment of the present invention, however, the direction of a point in relation to another point does matter.

For example, a title of junior software engineer at company A may be embedded at a first point, a title of software engineer at company A may be embedded at a second point, and a title of software engineer at company B may be embedded at a third point. The distance between the first point and the second point may be 1.0, while the distance between the second point and the third point may be 1.25. Assume, for example, that in this embedding a distance of 1.0 is roughly equivalent to a single seniority level at a company. As such, from the distances it can be seen that junior software engineer at company A is approximately one seniority level different than software engineer at company A, and that software engineer at company A is a little more than one seniority level different than software engineer at company B. Nevertheless, the direction matters. If a job seeker who currently holds the position of software engineer at company A is seeking a job, it would not be desirable to recommend a job with the position of junior software engineer at company A if the embedded point for that position is lower than the embedded point for software engineer at company A, but it would be desirable to recommend the job if the embedded point for junior software engineer is higher than the embedded point for software engineer at company A. Likewise, it would not be desirable to recommend a job with a position of software engineer at company B if the embedded point for that position is lower than the embedded point for software engineer at company A, but it would be desirable to recommend the job if the embedded point for software engineer at company B is higher than the embedded point for software engineer at company A. Thus, unlike prior art embedding models, direction matters. In an example embodiment, the directionality is integrated into the values of the seniority score, by having job titles representing more senior jobs be assigned higher values than job titles representing less senior jobs.

The machine learning algorithm 202 may additionally utilize gradient descent during the learning process. A gradient is a measure of how much the output of a function changes if you change its input by some amount. In other words, a gradient measures the change in all weights with regard to the change in error.

Gradient descent is an optimization algorithm used to minimize some function by iteratively moving in the direction of steepest descent as defined by the negative of the gradient. In other words, repeated steps are taken in the opposite direction of the gradient of the function at the current point, because this is the direction of steepest descent.

Use of gradient descent in machine learning can be computationally cheaper (i.e., faster) than other optimization algorithms, and thus in some example embodiments it may be used (although it is not mandatory).

Figure 3:
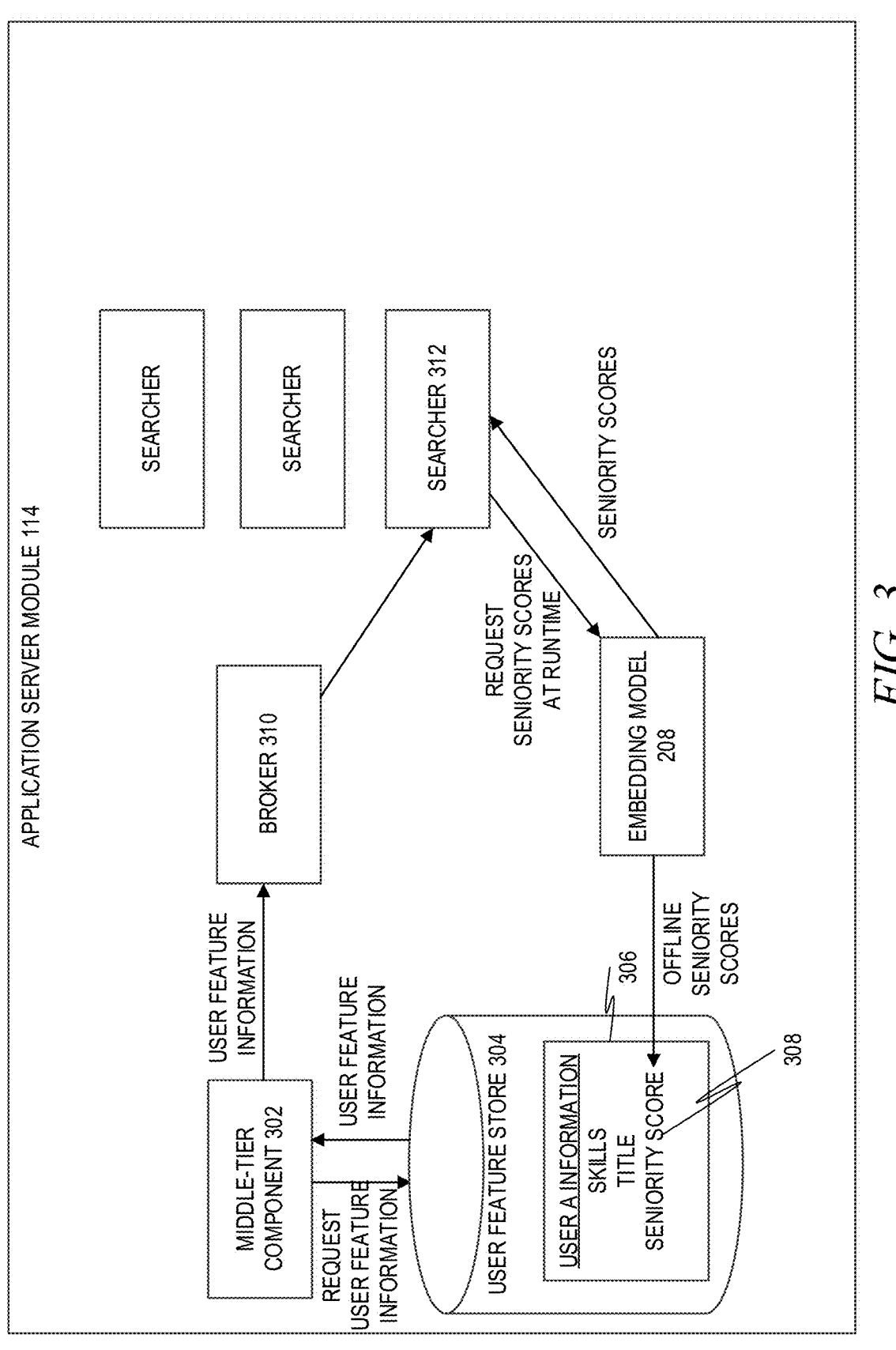
FIG. 3 is a block diagram illustrating an application server module, in accordance with another example embodiment.

FIG. 3 is a block diagram illustrating an application server module 114, in accordance with another example embodiment. Here, the application server module 114 performs a job search in an online network, in accordance with an example embodiment. It should be noted that in some example embodiments the components of the application server module 114 of FIG. 3 are located on the same application server module 114 as the application server module 114 of FIG. 2. In other words, in some example embodiments, the training and use of the embedding model 208 are both performed on the same application server module 114, while in other example embodiments the training of the embedding model 208 is performed on a different application server module from the use of the embedding model 208.

FIG. 3 depicts the embedding model 208 of FIG. 2 in a particular use case. One of ordinary skill in the art will recognize, however, that the concepts described herein are not limited to a job search context and may be used in any context in which a user needs or wants to compare titles between different entities, either directly (e.g., by being informed explicitly of the difference in levels between the titles) or indirectly (e.g., by being provided with recommendations or search results that reflect an appropriate title level). Other such example contexts include, but are not limited to, providing estimated salaries/compensation for different title/entity combinations based on the seniority scores.

As shown in FIG. 3, a middle tier component 302 may receive requests from various client computing devices and communicate appropriate responses to the requesting client devices. For example, the middle tier component 302 may receive requests in the form of Hypertext Transfer Protocol (HTTP) requests or other web-based Application Program Interface (API) requests. One such request may be a request for a job search. While this may arrive in the form of an explicit request for the job search from a client device (such as if the user operating the client device navigates to a job search page and types in job search-related keywords to search), it is also possible that the request may come indirectly, such as if the request is generated automatically in response to the user navigating to a section of the online network. Examples of such indirect requests may be when job recommendations are retrieved and presented automatically to the user when the user logs in, or in a feed section of the online network.

Regardless of the underlying reason the job search request was generated, in response to the request, the middle tier component 302 may request user information from a user feature store 304. Here, the job search is being performed on behalf of user A and thus user A's information 306 is depicted. This user A information 306 may be features extracted from a user profile or other user-specific data (such as activity data). Examples include skill/skill level (an identification of a skill a user has and their corresponding skill level in that skill), title (current job title), and employing entity (e.g., company that the user works for currently). Also contained in this user A information 306 may be a seniority score 308, which is calculated for the user by the embedding model 208. More particularly, in an example embodiment, the online network periodically (e.g., once a day) computes a seniority score for each user, based on each user's entity/title combination. Thus, in this case, the seniority score 308 is a score assigned to user A, based on user A's title and employing entity. The seniority score 308 is based on the embedding of the title/entity pair and its direction and distance from other embeddings.

The feature information is then returned to the middle tier component 302. At this point, the middle tier component 302 sends a job retrieval query along with one or more filters that are based on the retrieved user information, to broker 310. The filters may be explicitly requested by a user performing a search, or may be automatically added by a component that implies that a particular filter should be used, either generally or based on the context of the searcher. For example, even if a job searcher does not explicitly state so, it may be generally implied that the job searcher is looking for a job with a job title that is within a range of the seniority level of the job searcher's current job (i.e., not too much more junior or too much more senior). In such a case, a filter may be implied that job results should only be shown for jobs having a seniority score within the range specified by the filter. This automatic creation of filters may vary based on context, such as the industry of the jobs being searched, geographical area, or the channel in which the job search is being performed. In the latter case, for example, a different filter may be implied for job searchers who are presented jobs in the context of feed items (i.e., unsolicited) than for job searchers who are explicitly providing search parameters (i.e., solicited). As to the industry, an example scenario would be that a filter may be implied for job listings for jobs matching the user's current industry, but not added for jobs in other industries. This would allow, for example, a user with a high seniority position in one industry to be presented with results of much more junior positions in a completely different industry, reflecting the fact that changing industries often means needing to "start at the bottom."

The broker 310 then sends the job retrieval query and filters to a searcher 312, which retrieves and ranks jobs based on the retrieval query and filters.

Notably, these filters include a filter using the seniority score, which is a feature not available in prior art implementations. Lack of the ability to include seniority score as a filter in a job search query caused prior art embodiments to lack the ability to return search results based on the current seniority of the user, leading to imprecise results being returned. For example, without the seniority score, the broker would return results that match a search query, skills of the user, and title of the user, without regard for whether the user is senior or junior. Thus, an intern may wind up getting job search results including job listings for Chief Executive Counsel positions, or vice-versa. Use of the seniority score in this context allows the system to return job results that are more tailored to the user's current seniority level.

The searcher 312, in determining which job listings to return and ranking those job listings, may utilize both the user's seniority score 308 and a seniority score calculated, at runtime, for each job listing that is being considered. The searcher 312 is a computing component, and not a human searcher. It is the component that actually performs the searching of a database of job listings based on a query. The seniority scores for the job listings may be determined by passing the title/entity combination for each job listing being considered to the embedding model 208.

Thus, the embedding model 208 from FIG. 2 is used in two places in this embodiment. The first involves being used offline to generate a score for each user who may have a job search performed for them. The second involves being used online (at runtime) to generate a score for each job listing being considered for return in response to a job search.

It should be noted that there is more than one searcher 312 depicted in this figure, since it is common for searching tasks to be load balanced across multiple servers. The same processes described above can be applied in cases with multiple searchers as in cases with a single searcher.

It should also be noted that the filtering that occurs of the job listing results based on the seniority scores of the results and the job searcher can be performed in two ways. First, the searcher could use one or more conditions regarding the seniority scores as part of the search query itself, thus reducing the number of job listings returned based on the seniority score. In this example, the searcher could specify a condition that, for example, the seniority score of any returned search result be higher than the seniority score of the job searcher and be within a certain distance as well (e.g., between 0.5 and 1). Alternatively, the searcher could not condition the search query itself but could use the condition to filter the results. In this example, the searcher would obtain job listing results that included job listings having seniority scores that may violate the condition, but then may take steps to discard such job listing results from the set that is ultimately returned to the middle tier component 302.

The condition could require that (1) the seniority score of a job listing search result be higher than the seniority score for the job searcher and/or (2) the seniority score of a job listing search result is within a certain distance or range of distances of the seniority score for the job searcher.

Furthermore, in another example embodiment, a k-nearest neighbor clustering algorithm may be applied to the embeddings to cluster the title/entity pairs into groups of similar titles/entities. The k-nearest neighbour clustering algorithm is itself a machine learning algorithm where the training phase comprises storing the data (here the embedded points). In a classification phase, k is a predefined constant, and an unclassified embedded point is classified by assigning it to a cluster that is most frequent among the training samples nearest to that point. One distance metric that may be used is Euclidean distance.

Figure 4:
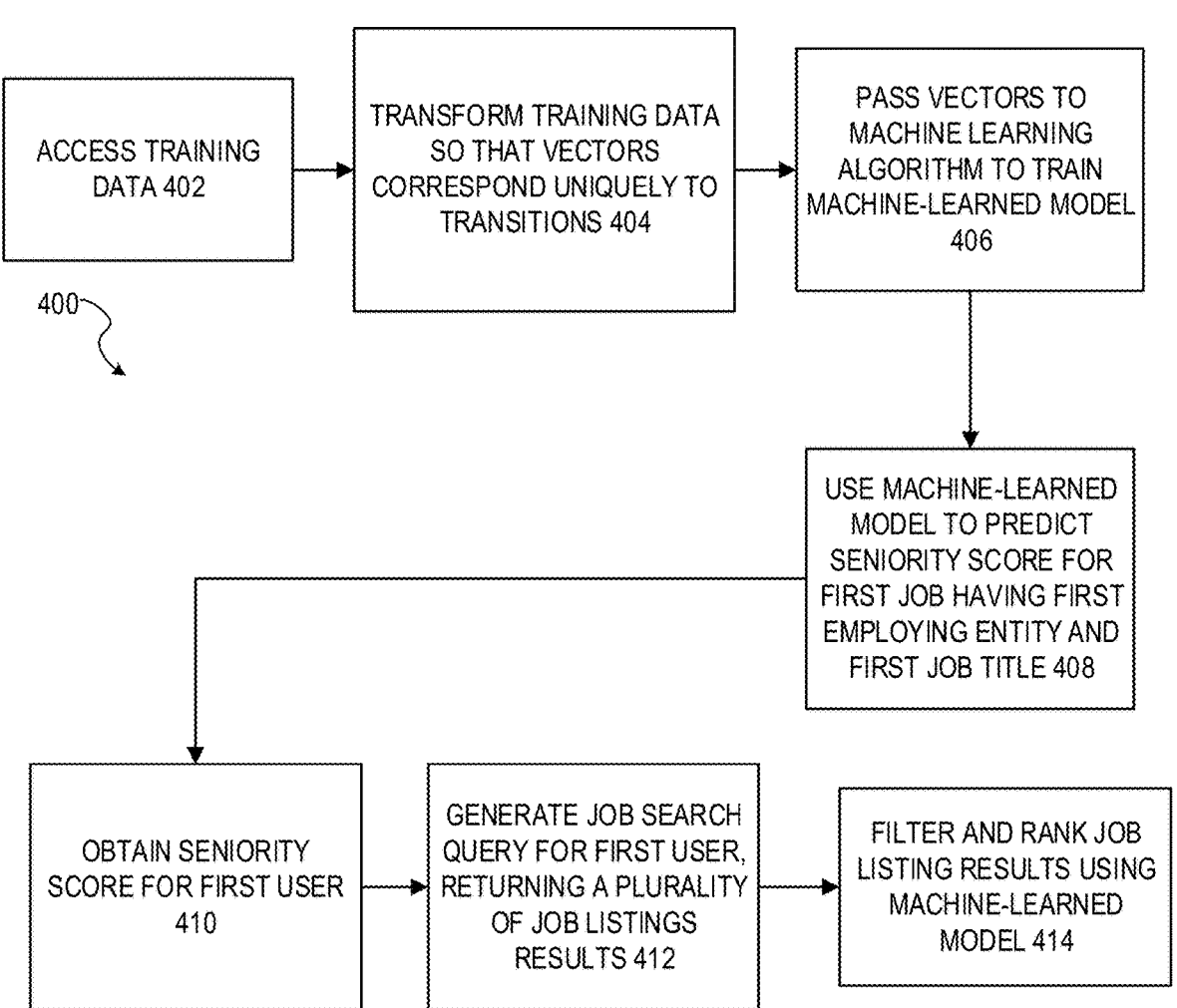
FIG. 4 is a flow diagram illustrating a method of training and using a machine-learned model, in accordance with an example embodiment.

FIG. 4 is a flow diagram illustrating a method 400 of training and using a machine-learned model, in accordance with an example embodiment. At operation 402, training data is accessed, including information about job transitions of users, a job transition including information about an employing entity and a job title for a source job and information about an employing entity and job title for a target job, as well as a duration of time between a start of the source job and a start of the target job. At operation 404, the training data is transformed so that vectors in the training data correspond uniquely to transitions in the training data.

At operation 406, the vectors in the training data are passed to a machine learning algorithm to train an embedding model, the training comprising calculating velocities for the vectors and using the velocities to train the embedding model by iteratively altering embeddings of the embedding model until a squared error of velocities for the vectors is minimized. At operation 408, the trained embedding model is used to predict a seniority score for a first job having a first employing entity and a first job title. The embedding model may project the vectors into a latent one-dimensional space.

At operation 410, a seniority score is obtained for a first user, the seniority score produced by passing a current employing entity and current job title of the first user to the embedding model. At operation 412, a job search query is generated for the first user, returning a plurality of job listing results. At operation 414, the job listing results are filtered and ranked by generating seniority scores for the job listing results using the embedding model and comparing the generated seniority scores to the obtained seniority score for the first user.

It should be noted that in some example embodiments, a user may be presented with an option to override one or more of the filters. Thus, for example, while many users may wish to only be presented with job listings for job titles that are within some reasonable range of seniority level of the user's current job, some users may wish to be presented with all job listings, regardless of seniority level (e.g., "I just want any job"). In an example embodiment, the user interface includes an option to override one or more of the implied filters.

When the user expressly provides a filter, the filter may include a filter based on seniority scores, and the user interface may be designed to present this in a variety of ways. One way would be to indicate the seniority score of the user's current job and then allow the user to add a filter that limits search results to only job listings for jobs with seniority scores at or within some absolute level or absolute level range (e.g., only jobs with seniority scores above 0.75). Another way would be to allow the user to add a filter that limits search results to only job listings for jobs with seniority scores at or within some relative level or relative level range (e.g., only jobs with seniority scores at least 0.3 above the users current job's seniority score).

Furthermore, in some example embodiments, the seniority score may be used outside the context of a job search. For example, the user may simply wish to know what the equivalent job title is at another company, and thus a user interface may use the seniority score of an input job title and find a job title (matching other attributes of the job) with a similar seniority score at the other company.

Figure 5:
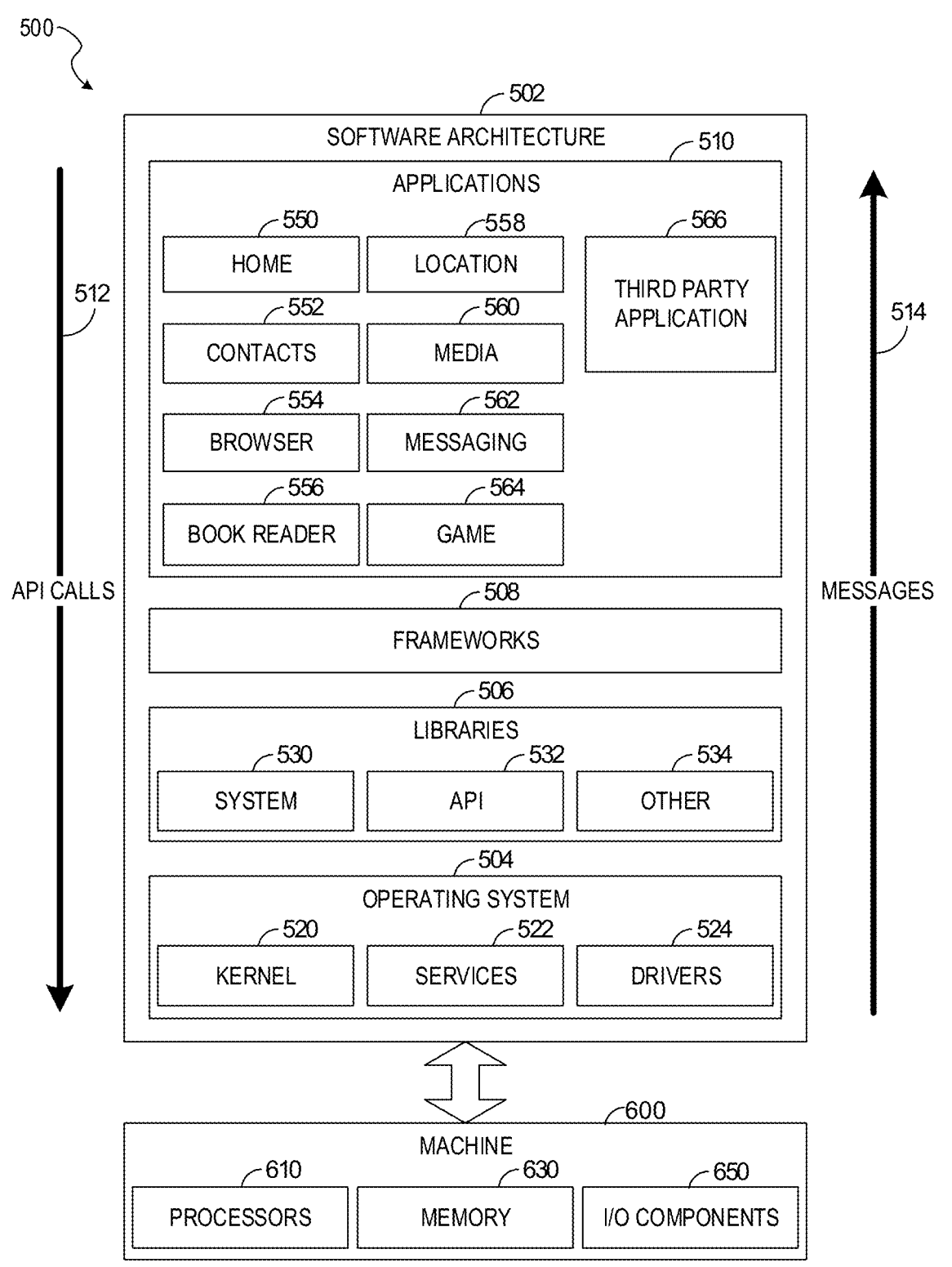
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
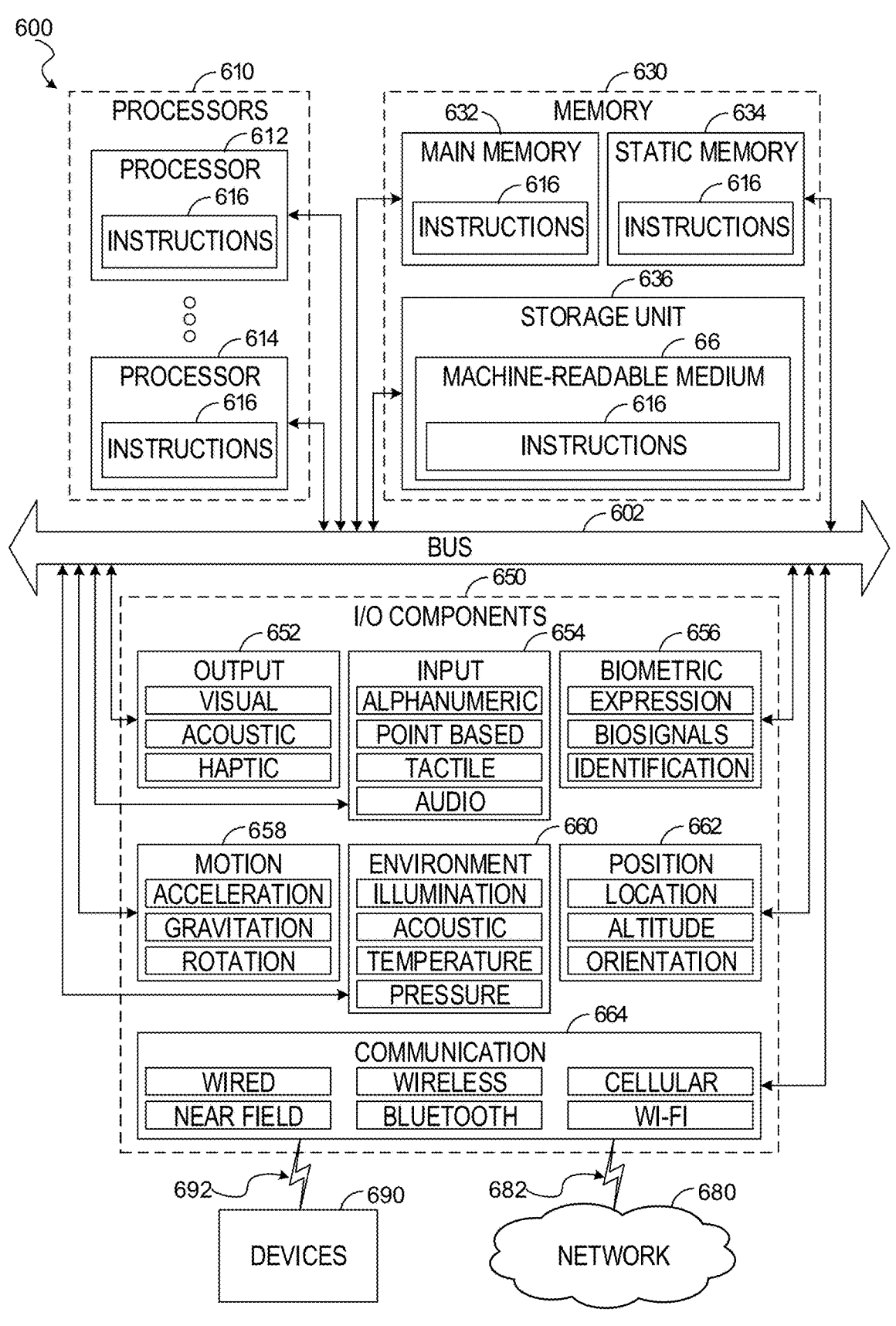
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine to perform any one or more of the methodologies discussed herein, according to an example embodiment. Specifically, FIG. 6 shows a diagrammatic representation of the machine 600 in the example form of a computer system, within which instructions 616 (e.g., software, a program, an application 510, an applet, an app, or other executable code) for causing the machine 600 to perform any one or more of the methodologies discussed herein may be executed. For example, the instructions 616 may cause the machine 600 to execute the method 400 of FIG. 4. Additionally, or alternatively, the instructions 616 may implement FIGS. 1-4, and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, all accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine 600 will depend on the type of machine 600. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 690 via a coupling 682 and a coupling 692, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 690 may be another machine or any of a wide variety of peripheral devices (e.g., a peripheral device coupled via a USB).

Moreover, the communication components 664 may detect identifiers or include components operable to detect identifiers. For example, the communication components 664 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 616 and/or data. The terms shall accordingly be taken to include, but not be limited to, solid-state memories, and optical and magnetic media, including memory internal or external to the processors 610. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 680 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 616 may be transmitted or received over the network 680 using a transmission medium via a network interface device (e.g., a network interface component included in the communication components 664) and utilizing any one of a number of well-known transfer protocols (e.g., HTTP). Similarly, the instructions 616 may be transmitted or received using a transmission medium via the coupling 692 (e.g., a peer-to-peer coupling) to the devices 690. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system, comprising:

circuitry; and a memory to store instructions that, when executed by the circuitry, causes the circuitry to:

access training data including information about job transitions of users, a job transition including information about an employing entity and a job title for a source job and an employing entity and job title for a target job, and a duration of time between a start of the source job and a start of the target job;

transform the training data so that vectors in the training data correspond to different job transitions in the training data, wherein a vector comprises a standardized format of a series of triples, each triple comprising an entity identifier, a job title, and a duration of time associated with the job title; and train an embedding model to calculate a velocity for a vector of a transition in the training data, the velocity comprising a seniority score for an employing entity and a job title for a target job of the transition minus a seniority score for an employing entity and job title for a source job of the given transition, divided by the duration of time for the transition, the trained embedding model to predict a seniority score for a first job having a first employing entity and a first job title.

2. The system of claim 1, wherein the embedding model projects the vectors into a latent one-dimensional space.

3. The system of claim 1, the circuitry to:

obtain a seniority score for a first user identifier, the seniority score produced by passing a current employing entity and current job title of the first user identifier to the embedding model;

generate a job search query for the first user identifier returning a plurality of job listing results;

generate seniority scores for the job listing results using the embedding model; and filter and rank the job listing results based on the seniority scores.

4. The system of claim 3, the circuitry to generate seniority scores for a plurality of user identifiers, including the first user identifier, by passing current employing entities and current job titles of the plurality of user identifiers to the embedding model.

5. The system of claim 4, the circuitry to store the seniority scores for the plurality of user identifiers in a member feature store.

6. The system of claim 5, wherein the member feature store additionally stores skills for the plurality of user identifiers.

7. The system of claim 5, the circuitry to compare skills of the first user identifier to skills in the plurality of job listing results.

8. The system of claim 1, the circuitry to:

obtain a seniority score for a first user identifier, the seniority score produced by passing a current employing entity and current job title of the first user identifier to the embedding model;

generate a job search query for the first user identifier, the job search query including a condition based on the seniority score for the first user identifier, returning a plurality of job listing results that meet the condition; and filter and rank the job listing results.

9. The system of claim 8, wherein the condition comprises:

a rule that job listing results have higher seniority scores than the seniority score for the first user identifier;

a rule that the job listing results have seniority scores within a certain distance to the seniority score for the first user identifier; or a rule that the job listing results have higher seniority scores than the seniority score for the first user identifier and also are within a certain distance to the seniority score for the first user identifier.

10. The system of claim 1, the circuitry to perform a k-nearest neighbor clustering algorithm on an embedded point produced by using the trained embedding model to predict a seniority score for a first job having a first employing entity and a first job title and on a plurality of embedded points produced by the embedding model during the training, to identify a cluster of embedded points that contain employing entities and job titles with seniority scores that most closely match the seniority score for the first user identifier.

11. A method, comprising:

accessing training data including information about job transitions of users, a job transition including information about an employing entity and a job title for a source job and an employing entity and job title for a target job, and a duration of time between a start of the source job and a start of the target job;

transforming the training data so that vectors in the training data correspond to different job transitions in the training data, wherein a vector comprises a standardized format of a series of triples, each triple comprising an entity identifier, a job title, and a duration of time associated with the job title; and training an embedding model to calculate a velocity for a vector of a transition in the training data, the velocity comprising a seniority score for an employing entity and a job title for a target job of the transition minus a seniority score for an employing entity and job title for a source job of the given transition, divided by the duration of time for the transition, the trained embedding model to predict a seniority score for a first job having a first employing entity and a first job title.

12. The method of claim 11, comprising:

obtaining a seniority score for a first user identifier, the seniority score produced by passing a current employing entity and current job title of the first user identifier to the embedding model;

generating a job search query for the first user identifier returning a plurality of job listing results;

generating seniority scores for the job listing results using the embedding model; and filtering and ranking the job listing results based on the seniority scores.

13. The method of claim 11, comprising:

obtaining a seniority score for a first user identifier, the seniority score produced by passing a current employing entity and current job title of the first user identifier to the embedding model;

generating a job search query for the first user identifier, the job search query including a condition based on the seniority score for the first user identifier, returning a plurality of job listing results that meet the condition; and filtering and ranking the job listing results.

14. The method of claim 13, wherein the condition comprises:

a rule that job listing results have higher seniority scores than the seniority score for the first user identifier;

a rule that the job listing results have seniority scores within a certain distance to the seniority score for the first user identifier; or a rule that the job listing results have higher seniority scores than the seniority score for the first user identifier and also are within a certain distance to the seniority score for the first user identifier.

15. The method of claim 11, comprising performing a k-nearest neighbor clustering algorithm on an embedded point produced by using the trained embedding model to predict a seniority score for a first job having a first employing entity and a first job title and on a plurality of embedded points produced by the embedding model during the training, to identify a cluster of embedded points that contain employing entities and job titles with seniority scores that most closely match the seniority score for the first user identifier.

16. A non-transitory machine-readable storage including machine-readable instructions, when executed by circuitry, causes the circuitry to:

access training data including information about job transitions of users, a job transition including information about an employing entity and a job title for a source job and an employing entity and job title for a target job, and a duration of time between a start of the source job and a start of the target job;

transform the training data so that vectors in the training data correspond to different job transitions in the training data, wherein a vector comprises a standardized format of a series of triples, each triple comprising an entity identifier, a job title, and a duration of time associated with the job title; and train an embedding model to calculate a velocity for a vector of a transition in the training data, the velocity comprising a seniority score for an employing entity and a job title for a target job of the transition minus a seniority score for an employing entity and job title for a source job of the given transition, divided by the duration of time for the transition, the trained embedding model to predict a seniority score for a first job having a first employing entity and a first job title.

17. The machine-readable storage of claim 16, comprising machine-readable instructions, when executed by circuitry, causes the circuitry to:

obtain a seniority score for a first user identifier, the seniority score produced by passing a current employing entity and current job title of the first user identifier to the embedding model;

generate a job search query for the first user identifier returning a plurality of job listing results;

generate seniority scores for the job listing results using the embedding model; and filter and rank the job listing results based on the seniority scores.

18. The machine-readable storage of claim 16, comprising machine-readable instructions, when executed by circuitry, causes the circuitry to:

obtain a seniority score for a first user identifier, the seniority score produced by passing a current employing entity and current job title of the first user identifier to the embedding model;

generate a job search query for the first user identifier, the job search query including a condition based on the seniority score for the first user identifier, returning a plurality of job listing results that meet the condition; and filter and rank the job listing results.

19. The machine-readable storage of claim 18, wherein the condition comprises:

a rule that job listing results have higher seniority scores than the seniority score for the first user identifier;

a rule that the job listing results have seniority scores within a certain distance to the seniority score for the first user identifier; or a rule that the job listing results have higher seniority scores than the seniority score for the first user identifier and also are within a certain distance to the seniority score for the first user identifier.

20. The machine-readable storage of claim 16, comprising machine-readable instructions, when executed by circuitry, causes the circuitry to perform a k-nearest neighbor clustering algorithm on an embedded point produced by using the trained embedding model to predict a seniority score for a first job having a first employing entity and a first job title and on a plurality of embedded points produced by the embedding model during the training, to identify a cluster of embedded points that contain employing entities and job titles with seniority scores that most closely match the seniority score for the first user identifier.

\* \* \* \* \*